Nov. 7, 1961   D. R. ABELL   3,007,337
ANGULAR POSITION TRANSDUCER
Filed April 6, 1959

INVENTOR.
DWIGHT R. ABELL
BY Roy Mattern Jr.
ATTORNEY

United States Patent Office 3,007,337
Patented Nov. 7, 1961

3,007,337
ANGULAR POSITION TRANSDUCER
Dwight R. Abell, Seattle, Wash., assignor to Boeing Airplane Company, Seattle, Wash., a corporation of Delaware
Filed Apr. 6, 1959, Ser. No. 804,215
1 Claim. (Cl. 73—134)

This invention relates to an electro-mechanical device having a high degree of resolution to sense, measure and utilize angular mechanical motion for informative purposes when associated with indicators or data recorders and for control purposes when associated with additional electrical power equipment.

The invention is extremely useful throughout a wide range of environments from the most delicate to the very rugged. Wherever there is a need to know how many limited rotations or how many degrees of a partial revolution have occurred, the invention becomes the focal point of the transmittal of such intelligence.

Other devices such as bonded strain gages and potentiometers have been employed in a like manner, however, all are limited in their range of accurate sensitivity, and furthermore, there are gaps between their operating ranges. This invention, therefore, is directed to the provision of an electro-mechanical device which serves in whole or in part the operating ranges of present devices and bridges the gaps of performance between them.

Briefly, the invention's performance capabilities are attributable to an arrangement of electrical conductors extending between a stator and rotor in a partial or complete bridge circuit configuration for undergoing or being relieved of stresses as a spring modulated torque is applied to the rotor.

Figure 1:
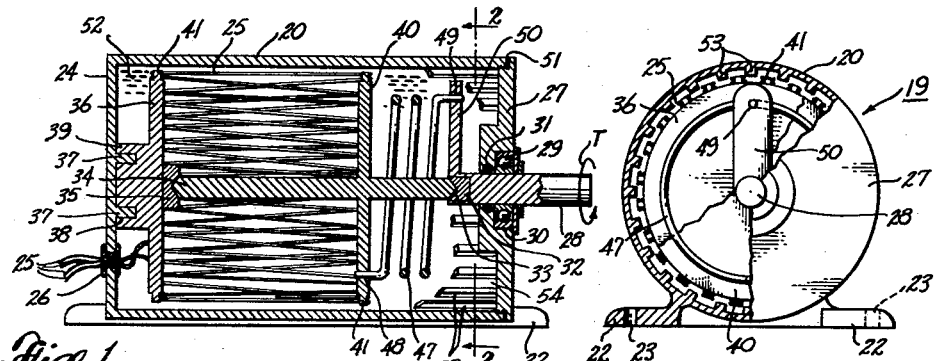
Figure 2:
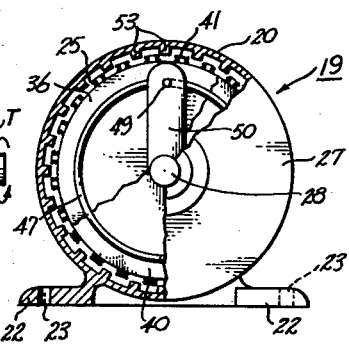
Figure 3:
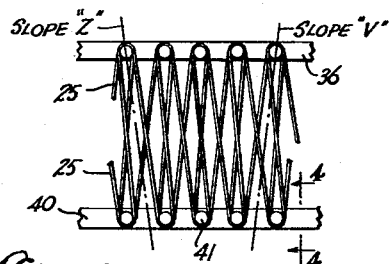
Figure 4:
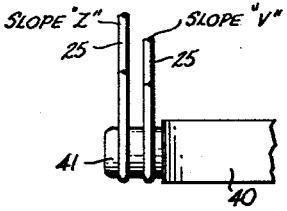
Figure 5:
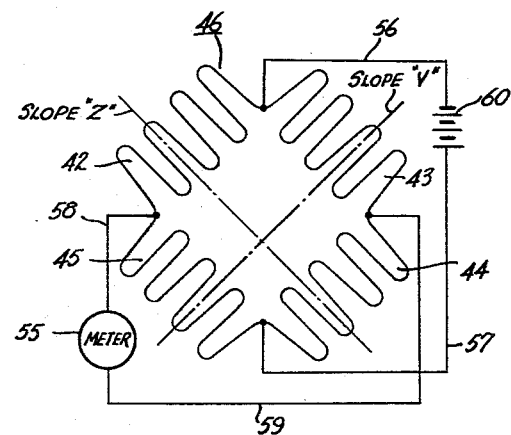

This invention, referred to more briefly as an angular position transducer, with its accompanying assets of low cost, upkeep and maintenance stemming from its simplicity, is hereafter described in greater detail with reference to the drawings wherein:

FIG. 1 is a cross section view along the longitudinal axis of the angular position transducer, FIG. 2 is a cross section transverse of the longitudinal axis taken along sectional line 2—2 of FIG. 1, FIG. 3 is a segment view of the conductors extending between the stator and rotor, FIG. 4 is a segment section view taken along sectional line 4—4 of FIG. 3, FIG. 5 is a schematic layout of bridge circuit composed of the conductors illustrated in FIGS. 1 through 4, and FIG. 6 is a broken perspective view of the incasement shown in FIGS. 1 and 2.

FIGS. 1 and 2, both sectional, illustrate a preferred embodiment of the invention, the components of the electro-mechanical device 19, referred to as the angular position transducer 19, are conveniently and effectively arranged within an incasement 20 having a substantially cylindrical shape with a mounting base 22, having holes 23 to accommodate fasteners (not shown) when the transducer is secured to structure (not shown). At one end 24, as shown in FIG. 1, electrical conductors 25 from the reference voltage supply (see FIG. 5) and to the indicating meter (see FIG. 5) pass into the incasement through an oil and pressure tight grommet 26. At the other end 27, a shaft 28 protrudes from the incasement 20 to provide a place where torque T may be applied to the transducer 19.

The remaining components are all within the incasement 20. The shaft 28 is supported in a roller bearing 29 which in turn is fitted into an embossed recess 30 in the incasement end 27. An oil tight pressure shaft seal 31 is also installed in the embossed recess 30 adjacent to the bearing 29. Inside the incasement 20, the shaft 28 terminates in a central conical bearing recess 32 which receives a complementary pointed end 33 of an aligned shaft 34. The separately rotatable shaft 34 continues through the interior of the incasement 20 terminating in a conical recess bearing 35 which in turn is secured to a stator 36. Positioning pegs 37 locate the stator 36 with respect to the interior of the incasement end 24 as the pegs 37 are aligned with holes 38 in an embossed central portion 39 of the stator 36.

Secured on the aligned shaft 34, spaced from the stator 36, is a complementary rotor 40. Between the stator 36 and the rotor 40 are the continuing electrical conductors 25. As shown throughout FIGS. 1 through 4, these conductors 25 are pre-stressed and passed around guide posts 41 located on both the stator 36 and rotor 40, forming the four legs, 42, 43, 44 and 45 of a bridge circuit 46 as shown in FIG. 5. Paired opposite legs 42, 44, and legs 43, 45 are respectively wound around the guide posts 41 so their like angular relationship with an imaginary perpendicular cylindrical element, either "Z" or "V," is equal and opposite with respect to the other pair of legs.

The rotor 40 is also spaced from the other end of the incasement 27 to accommodate the positioning of a coiled transfer spring 47, which is oriented about the aligned shaft 34 and anchored at one end 48 to the rotor 40, and at its opposite end 49 to crank arm 50, which in turn is secured to the torque receiving shaft 28.

This entire interior assembly may be pre-assembled outside and subsequently inserted into the incasement 20 and held in place by the threaded and sealed joint 51, where the incasement end 27 abuts the interior of the transducer 19.

Figure 6:
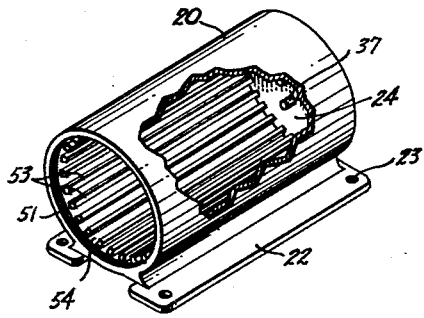

When required, just prior to this final assembly, a damping medium 52, a dielectric liquid such as mineral oil, is poured into the incasement 20. Also to further increase the effectiveness of such a damping medium 52, ribs 53 are formed on the interior wall 54 of the incasement 20 as shown in FIG. 6.

Once assembled, sealed and calibrated, the transducer 19 is ready for any use (1) where it is important to know the magnitude, direction, and/or rate of change of angular mechanical motion, and (2) where for convenience, reliability, and/or speed of recording, such knowledge must be transmitted by electrical and/or electronic means. It is triggered into operation as a torque T is applied to the shaft 28 rotating the crank arm 50 which in turns loads the transfer spring 47. This spring loading effectively commences movement of the rotor 40 with respect to the stator 36. The electrical conductors 25 of the bridge circuit 46 consequently are reorientated resulting in one pair of the opposite legs such as 42—44 being stressed an additional amount, and the other pair 43—45 being stress relieved. Then as the relative movement between the rotor 40 and stator 36 is reversed, the respective pairs of bridge legs undergo correspondingly varying stresses being ultimately oppositely effected.

These stress changes and their rate of change coextensively cause resistance, current and voltage changes in the bridge circuit. By use of conventional instruments (not shown) observations of the transitions are made available on dial faces of meters 55, charts, tapes and other data recorders (not shown). As long as an energy source such as the batteries 60 supply a voltage across the input electrical conductors 56—57, an indicating instrument connected across the output electrical conductors 58—59 will provide a signal which when compared and recorded with others will (1) set forth the data for a researcher, or (2) direct the operation of control devices for such equipment as: automatic pilots of aircraft, automatic machine tools, calculating instruments, etc.

Wherever there is a need for converting the magnitude of angular mechanical motion into a comparable change in magnitude of electricity or the reverse thereof for these purposes directly or indirectly, this electro-mechanical device will fulfill the requirement.

I claim as my invention:

An electro-mechanical device for indicating angular motion about an axis comprising an incasement with a mounting base; a stator; means for statically mounting the stator in the incasement; a rotor; shaft means structurally connecting only the centers of the rotor and the stator for positioning the rotor and stator in axial alignment restricting their axial translation and maintaining their parallel relationship without hindering their relative rotation capabilities; guide posts equally spaced about the periphery of both the rotor and the stator at places radially equidistant from the respective centers of the rotor and the stator; electrical conductors forming the legs of a bridge circuit equally pre-strained between the rotor and stator; conductive elements of the respective legs of the bridge circuit partially encircle the guide posts and are multiply redirected between the guide posts located respectively on both the rotor and stator; the conductive elements of two legs of the bridge circuit being extended on a uniform bias between the guide posts of the rotor and stator; and the conductive elements of the remaining two legs of the bridge circuit being extended on a uniform bias, equally opposite to the bias of the conductive elements of the other two legs, between the guide posts of the rotor and stator; and means to receive and apply torque to the rotor independently of the stator causing relative motion between the rotor and the stator, thereby oppositely effecting the strain of the pairs of the legs of the bridge circuit.

References Cited in the file of this patent

UNITED STATES PATENTS

| | | |
|---|---|---|
| 2,393,714 | Simmons | Jan. 29, 1946 |
| 2,703,935 | Mead | Mar. 15, 1955 |
| 2,748,355 | Jarvis | May 29, 1956 |
| 2,759,157 | Wiancko | Aug. 14, 1956 |